United States Patent
Favre

[15] 3,691,438
[45] Sept. 12, 1972

[54] SIGNAL GENERATOR FOR ELECTRONIC COMMUTATION OF A MOTOR

[72] Inventor: Robert Favre, 36 Rue du Servan, 1000, Lausanne, Switzerland

[22] Filed: July 6, 1970

[21] Appl. No.: 52,669

Related U.S. Application Data

[63] Continuation-in-part of Ser. No. 674,968, Oct. 12, 1967, abandoned.

[52] U.S. Cl. .................318/138, 318/227, 318/230, 318/231
[51] Int. Cl. ...........................................H02k 29/00
[58] Field of Search...............318/138, 227, 230, 231

[56] References Cited

UNITED STATES PATENTS

| | | |
|---|---|---|
| 3,387,195 | 6/1968 | Piccand et al. .............318/227 |
| 3,477,002 | 11/1969 | Campbell ..................318/227 |
| 3,372,323 | 3/1968 | Guyeska................318/231 X |
| 3,323,032 | 5/1967 | Agarwal et al.........318/227 X |

*Primary Examiner*—Gene Z. Rubinson
*Attorney*—Robert E. Burns and Emmanuel J. Lobato

[57] ABSTRACT

Control signals for electronic commutation of an electric motor have three related frequencies, namely a "synchronous" frequency proportional to the speed of rotation of the motor, a control or "resultant" frequency representing the frequency of pulses controlling commutation of the motor and hence characteristic of the rotation or commutation of the motor field and a "slip" frequency representing the difference between the "resultant" frequency and the "synchronous" frequency and hence characteristic of the "slip" of the rotor of the motor with respect to the rotation or commutation of the motor field. A signal generator for controlling the commutation of an electronically commutated motor comprises means for individually generating two of these three characteristic frequencies and means for electronically deriving the third characteristic from the other two.

8 Claims, 4 Drawing Figures

SIGNAL GENERATOR FOR ELECTRONIC COMMUTATION OF A MOTOR

This application is a continuation-in-part of my copending application Ser. No. 674,968 filed Oct. 12, 1967 now abandoned.

The present invention relates to electronic commutation of electric motors.

Various procedures are known for feeding the windings of an electric motor from a direct current source by electronic commutation by means of suitable switching elements, for example thyristors or transistors, under control of a suitable control circuit for switching the commutation elements to energize the field windings of the motor in proper sequence and at a selected rate to provide a rotating or moving field. Control of the commutation is generally provided by a pulse generator producing a monophase signal which controls the switching elements of the commutation circuit. In the case of a polyphase motor, for example a three phase motor, sequential commutation of the motor windings is provided by means of a suitable form of closed circuit impulse counter which acts as a distributor to feed the control pulses sequentially and cyclically to the switching elements controlling the several phase windings in order to energize the windings in proper sequence and proper timed relation to one another.

In a polyphase motor, commutation of the current supplied to the field windings is effected so as to produce a rotating field. Similarly, a moving field for producing rotation of the rotor is provided by the commutation of a single phase motor. In an induction type motor the rotor lags behind the field, i.e., the speed of the rotor is less than that of the field. The difference between the field speed and the rotor speed is referred to as "slip". The same is true of a synchronous motor during starting since the motor has the characteristics of an induction motor until it reaches synchronous speed.

As the operations effected by the control signals in the electronic commutation of an electric motor are a type of "logic", it is of interest to note that the control signals have three frequency characteristics that may be called the "synchronous" component, the "slip" component and the "resultant" frequency. The "synchronous" component is proportional to the speed of the motor while the "slip" component is proportional to the "slip" of the rotor of the motor with respect to the field. The "resultant" frequency is proportional to the speed of rotation or commutation of the motor field and represents the sum of the "synchronous" and "slip" components. Hence, any one of these three characteristics can be derived from the other two by an arithmetical operation.

A difficulty frequently encountered in the control of an induction motor by electronic commutation is that of maintaining the "slip" component within limits adapted to the conditions of optimal operation of the motor.

The present invention has for its object a circuit for generating signals for the control of electronic commutation of an induction motor characterized by the fact that the circuit comprises means for generating individually two of the three above mentioned characteristics of the control signals, namely the "synchronous" component, the "slip" component and the "resultant" frequency and means for deriving the third characteristic from the other two by an arithmetical operation effected electronically.

The invention will be more fully understood from the following description in conjunction with the accompanying drawings in which.

Figure 2:
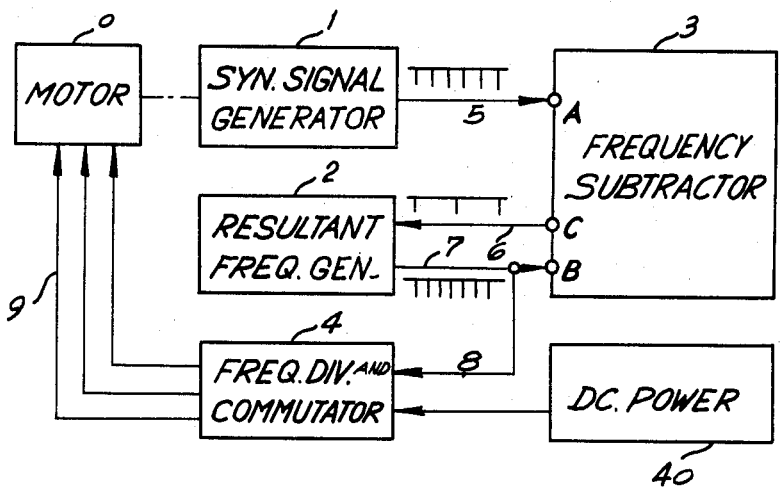
FIG. 2 is a block diagram of a circuit for generating pilot signals in which the "synchronous" component and the "resultant" frequency are individually generated, the "slip" component being obtained by an electronic subtraction of the "synchronous" component from the "resultant" frequency.
Figure 3:
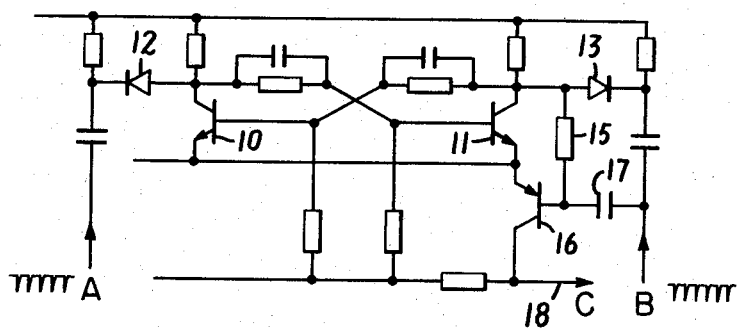
FIG. 3 is a circuit diagram of the circuit for electronic subtraction of the components in accordance with FIG. 2 as represented by the block 3 in FIG. 2.
Figure 4:
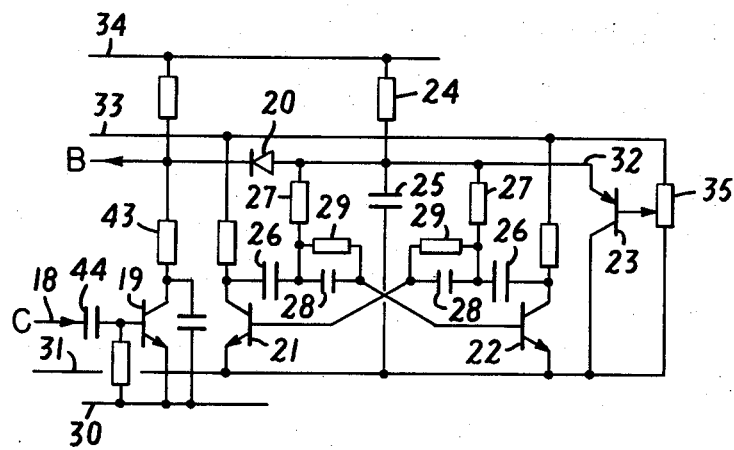
FIG. 4 is a circuit diagram of a pulse generator circuit for generating the "resultant" frequency in accordance with FIG. 2 as represented by the block 2 in FIG. 2.

In FIG. 2 the circuitry shown in FIG. 3 is represented by the block 3 and the circuitry shown in FIG. 4 is represented by the block 2. Corresponding points of connection are indicated by the letters A, B and C respectively. Thus, inputs A and B in block 3 of FIG. 2 correspond to inputs A and B in FIG. 3 while the output C shown in FIGS. 2 and 3 is connected with the input C of FIG. 4.

Figure 1:
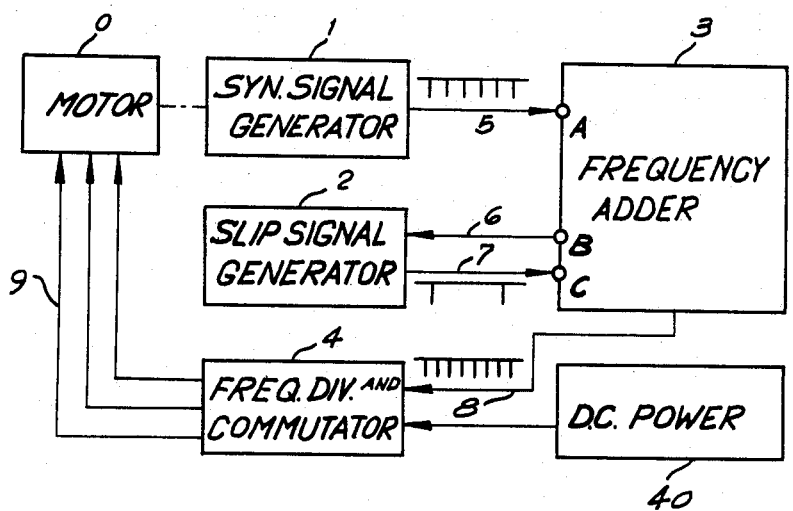
FIG. 1 is a block diagram of a circuit for generating pilot signals in which the "synchronous" and "slip" components are generated individually, the "resultant" frequency being obtained by an electronic addition of these two components.

In the circuit shown in FIG. 1, the motor 0 drives a pulse generator 1 which generates pulses in synchronism with the motor and thus corresponding to the "synchronous" component. This generator can be designed in many ways, particularly by the interaction of an "emitter" and of a "pick up", the interaction being intercepted by a disc which is fixed to the rotor of the motor and is solid except for suitable gaps in its periphery in such manner as to deliver as many signals per revolution of the motor as there are gaps in the disc. The interaction can be photoelectric, electromagnetic, capacitive magnetic, etc. For example, the "emitter" may be in the form of a lamp and the "pick up" in the form of a photosensor, for example a photodiode.

Block 2 represents a pulse generator for generating pulse signals at a frequency corresponding to the "slip" component. The pulse generator may be of any desired type for generating pulses at a controllable frequency and may for example comprise a variable frequency multivibrator as in the pulse generator which is shown in FIG. 4 and will be described below. The frequency of the "slip" signals is made subject to the speed of the motor by an input through channel 6 and is maintained in the range best adapted to the prevailing conditions of operation of the motor.

Block 3 comprises a frequency adder for adding the "synchronous" component received from block 1 through channel 5 and the "slip" component received from block 2 through channel 7. The sum of these two components represents the "resultant" frequency and is directed through channel 8 to block 4. The circuit may for example be a multivibrator which is triggered both by pulses of the "synchronous" component and pulses of the "slip" component so that the output frequency is the sum of the two input frequencies. The circuit of block 3 also delivers to block 2 through channel 6 a corrective or control signal for regulating the frequency of the "slip" component produced by the pulse generator of block 2 in order to provide a "slip" frequency of optimal value for the prevailing operating conditions of the motor.

Block 4 comprises circuitry for commutating direct current received from a dc power source 40 and feeding the commutated current through channel 9 to the field windings of the motor 0. The motor is shown by way of example in the drawings as a three phase motor and channel 9 accordingly comprises a three phase line. With a polyphase motor, the commutation circuit comprises transistors or other switching elements for each phase and a "distributor" for example in the nature of a closed circuit pulse counter for distributing the pulses received through channel 8 sequentially and cyclically to the switching elements of the several phases so as to control the switching of the respective switching elements in proper sequence and time relation. With a single phase motor, such "distributor" is not required. The block 4 also preferably comprises an electronic frequency divider which acts proportionally to reduce the frequency received through channel 8 from block 3. The reduced frequency is utilized to control commutation of the motor. This preliminary division of the frequency permits starting with a relatively high frequency having the advantage of reducing the time of response to the information supplied to block 3 through channels 5 and 7.

Electronic commutation circuitry for polyphase motors is shown for example in my copending applications Ser. No. 676,871 filed Oct. 20, 1967 and Ser. No. 682,176 filed Nov. 13, 1967. Circuitry for the electronic commutation of single phase motors is shown for example in Favre U. S. Pat. Nos. 3,309,592 and 3,436,631.

In FIG. 2 as in FIG. 1, the block 1 comprises a pulse generator for generating pulses at a frequency corresponding to the speed of the motor 0 thus producing "synchronous" component as described above. Block 2 represents a pulse generator for producing pulses at a variable frequency corresponding to the "resultant" frequency. BLock 3 represents circuitry for processing the information received from blocks 1 and 2 and performing a subtraction of the "synchronous" component from the "resultant" frequency so as to obtain the "slip" component which is applied to the pulse generator 2 through channel 6 so as to correct and control the "resultant" frequency. A branch channel 8 conducts the signals of the "resultant" frequency to the commutation circuit of block 4 which performs the same functions as described above in the case of FIG. 1. The control signals supplied to block 4 through channel 8 are equidistant, contrary to the case of FIG. 1, which assures a better stability of operation particularly at low speeds.

FIG. 3 shows a very simple circuit for the electronic subtraction of frequency signals and corresponds to the block 3 in FIG. 2. The transistors 10 and 11 with associated components operate as a bistable multivibrator or "flip-flop". When the transistor 10 is conducting, the transistor 11 is nonconducting and conversely when the transistor 11 is conducting the transistor 10 is nonconducting. A pulse received at input A in FIG. 3 (corresponding to input A of block 3 in FIG. 2) from the synchronous pulse generator 1 is transmitted through a capacitor 41 and diode 12 to the collector of the transistor 10 causing it to become conductive and thereby causing transistor 11 to be blocked. In similar manner a pulse received at input B of FIG. 3 (corresponding to input B of block 3 in FIG. 2) from the "resultant" frequency pulse generator 2 is transmitted through a capacitor 42 and diode 13 to the collector of transistor 11 thereby causing it to become conductive and blocking transistor 10. The diodes 12 and 13 assure a selective effectiveness of the signals and wholly decouple the pulse generators from the bistable multivibrator.

Input B in FIG. 3 is also connected through a capacitor 17 and output transistor 16 to an output channel 18 leading to an output terminal C. The emitter of transistor 16 is connected with the emitter of transistor 11 while the base of transistor 16 is connected through a resistance 15 to the collector of transmitter 11. By reason of its bias, the output transistor 16 is normally blocked and can only deliver an output pulse to a channel 18 when it receives through the capacitor 17 a pulse of "resultant" frequency from block 2 at a time when the transistor 11 is conducting. If the frequency of the signal of the "synchronous" component is equal to the "resultant" frequency, the pulses received at input A and B alternate with the result that the transistor 11 is always locked when a pulse is received at input B. Hence, under these conditions, the output transistors 16 can not deliver any pulse to the output channel 18. If on the other hand, the "resultant" frequency is higher than the "synchronous" component, it happens periodically that two successive pulses are applied to the input 2 without any pulse on the input 1. The second pulse applied at input 2 then finds the transistor 11 conductive and hence a pulse is delivered by the transistor 16 to the channel 18. It will be seen that the number of pulses delivered to the channel 18 is equal to the number of pulses received at input B from the "resultant" frequency generator 2 minus the number of pulses received at input A from the "synchronous" frequency component generator 1. The frequency of the pulses delivered to the channel 18 thus represents the "slip" component. The process of subtraction functions here only in the case of a "resultant" frequency higher than the frequency of the "synchronous" component (positive slip component) which is of interest.

FIG. 4 which corresponds to the block 2 in FIG. 2 shows the circuit of a pulse generator for generating signals of the "resultant" frequency with provision for correcting the starting frequency of the "slip" component. The transistors 21 and 22 together with associated components including capacitors 26 and 28 and resistors 27 and 29 comprise a multivibrator. The lines 30, 31, 33 and 34 supply fixed potentials from a suitable voltage source (not shown). The voltages of lines 30, 31, 33 and 34 are arranged in the order of the numbering of the lines, line 30 being lowest in voltage and line 34 highest. By virtue of the special coupling between transistors 21 and 22 comprising the capacitor 28 and resistor 27 connected in series and the capacitor 28 and resistor 29 connected in shunt, the multivibrator has a frequency which is variable over a very large range. The resistor 27 and capacitor 28 comprise a delay circuit with a time constant much greater than that of the capacitor 28 and the resistor 29.

The emitters of the transistors 21 and 22 are connected through a capacitor 25 to a voltage supply line 32 which in turn is connected through a resistance 24 to a fixed potential supply 34. With the connections shown, the frequency of oscillation of the multivibrator is variable over a very large range as a function of the potential of line 32 which depends on the amount of charge of the capacitor 25 and is therefore variable. The voltage supply line 32 is connected through a diode 20 and a resistance 43 to the collector of a transistor 19, the base of which is connected through a capacitor 44 and a channel 18 with the collector of the output transistor 16 of the "subtraction" circuit shown in FIG. 3. The transistor 19 is normally non-conducting, but is momentarily unblocked by the "subtraction" pulses received through channel 18 from the circuitry shown in FIG. 3. When the transistor 19 is conductive, the potential of the supply line 32 is decreased by the diode 20, becoming conductive so as to discharge the capacitor 25. The potential of line 32 and hence the frequency of oscillation of the multivibrator comprising transistors 21 and 22 is varied according to the frequency of the "subtraction" pulses (slip component) received through a channel 18 from the subtraction circuit shown in FIG. 3. As the "slip" component frequency increases, the frequency of oscillation of the multivibrator decreases thereby decreasing the frequency of pulses supplied at the output B of the multivibrator which is connected through channel 7 with the input B of the frequency subtractor of FIG. 3 (block 3 in FIG. 2) and through channel 8 with the commutation of circuit of Block 4 in FIG. 2. A transistor 23 is connected between the line 32 and the lower voltage supply line 31 of the voltage supply serves to provide a limit of the potential of line 32 as a function of adjustment of a potentiometer 35 in its base circuit. The resistor 24 limits the rate of charging of the condensor 25 and thus the rate of increase of potential of line 32 during starting of the motor and between successive subtraction of pulses.

The operation of the motor and its control circuit is as follows:

At the starting of the motor, the potential of the supply line 32 starts at a value near the potential of supply line 31 which assurs a minimum "resultant" frequency (slip component) initially in the neighborhood of 4 Hz. The values of the resistor 24 and the capacitor 25 determine the rate of increase of the potential of line 32 and its "resultant" input frequency until the limit determined by the adjustment of the potentiometer 35 is reached. If the rate of increase in the "resultant" frequency which controls the commutation of the motor is compatible with the acceleration of the motor, correction does not occur in this first phase. If, on the contrary, the increase of the "resultant" frequencies is too rapid, there is an increase of the "slip" component as evident by "subtraction" pulses transmitted from the frequency subtraction circuit of FIG. 3 through the channel 18 and through transistor 19 and diode 20, as described above, in a manner to limit the potential of line 32 and thereby retard the rate of increase of the "resultant" frequency.

The normal operating speed of the motor is determined by the limitation of the potential of line 32 by the transistor 23 under control of the potentiometer 35. If an overload on the motor brings about an excessive "slip" component, the resulting "subtraction" pulses acting through the transistor 19 and diode 20 automatically decrease the operating voltage of the multivibrator and hence the frequency of the multivibrator in a manner to reduce the "resultant" frequency so as to maintain maximum torque. The multivibrator shown in FIG. 4 permits variation of frequency over a very wide range for example, in the ratio of 1/200. The means described for obtaining this effect can, if desired, be replaced by a unijunction transistor.

By assuring a "slip" frequency of the motor that is always well adapted to the conditions of operation, the circuitry according to the present invention permits deriving maximum advantage from electronically commutated motors for which the peak current is always limited to a value in the vicinity of the normal current range in order to avoid damaging transistors or other circuit components.

While preferred embodiments of the invention have been illustrated in the drawing herein particularly described, it will be understood that features of the illustrated embodiments are mutually interchangeable insofar as they are compatible and that other modifications in circuitry may be made. The invention is hence in no way limited to the illustrated embodiments.

What I claim and desire to secure by Letters Patent is:

1. In a signal generator for electronic commutation of a direct current motor, the combination of a first pulse generator coupled with said motor and producing pulses of a first frequency in synchronism with the rotation of said motor, a second pulse generator for producing pulses of a variable second frequency, said second pulse generator comprising a multivibrator including a voltage responsive delay circuit controlling the frequency of oscillation of said multivibrator, circuit means for subtracting the frequency of said pulses produced by said first pulse generator from the frequency of the pulses produced by said second pulse generator, means responsive to the output of said subtracting means for producing a voltage having a value varying with the difference between said first and second frequencies, means for applying said voltage to said voltage responsive delay circuit to regulate the frequency of oscillation of said multivibrator to increase the frequency of oscillation of said multivibrator upon decrease of said difference and to decrease the frequency of oscillation of said multivibrator upon increase in said difference, means for providing an upper limit of the potential applied to said voltage responsive delay circuit and thereby limiting the speed of the motor, and means including a frequency divider for transmitting pulses of said regulated frequency of said multivibrator to said motor.

2. A signal generator for electronic commutation of a direct current motor according to claim 1, in which said multivibrator comprises two transistors and two delay circuits coupling said transistors, one of said delay circuits having a time constant much greater than the other.

3. A signal generator for electronic commutation of a direct current motor according to claim 1, in which said potential limiting means comprises a transistor and a potentiometer controlling the bias of said transistor.

4. A signal generator for electronic commutation of a direct current motor according to claim 1, in which said frequency subtracting circuit means comprises a bistable circuit including two transistors and an output circuit comprising a third transistor coupled to said bistable circuit, means for applying pulses from said first pulse generator to an input of said bistable circuit and means for applying pulses from said second pulse generator to said third transistor.

5. In a signal generator for electronic commutation of an induction motor having field windings and a rotor and electronic commutating means for supplying current to said field windings to produce a moving field, the combination of a first pulse generator actuated by the rotor of said motor and producing pulses at a frequency which is a function of motor speed, a second pulse generator supplying pulses to said commutating means to control the rate of commutation of said commutating means and thereby control the speed of movement of said field, the frequency of said second pulse generator being variable and controllable, the speed of rotation of said rotor being less than the speed of movement of said field by an amount designated slip, means for sensing said slip, and means responsive to said slip sensing means to control the frequency of said second pulse generating means to vary said frequency inversely with said slip and thereby maintain said slip within selected limits, said slip sensing means comprising electronic means for subtracting the frequency of pulses produced by said first pulse generator from the frequency of pulses produced by said second pulse generator and producing a signal having a frequency proportional in value to the difference of said frequencies, said subtracting means comprising a bistable multivibrator controlled by pulses from said first pulse generator, and a transistor the conduction of which is controlled by said multivibrator and pulses from said second pulse generator.

6. A signal generator according to claim 5, comprising means for limiting the frequency of said second pulse generator to a selected maximum value, thereby determining the normal running speed of said motor.

7. A signal generator according to claim 5, in which second pulse generator comprises a variable frequency multivibrator the frequency of which is variable as a function of an applied voltage and in which said means to control the frequency of said second pulse generator comprises means for varying said applied voltage as a function of the difference between the frequencies of said second pulse generator and said second pulse generator.

8. A signal generator according to claim 9, comprising means for limiting said applied voltage and thereby limiting the frequency of said variable frequency multivibrator, said voltage limiting means comprising a transistor and a potentiometer controlling the bias of said transistor.

* * * * *